July 11, 1967  G. H. WHITESIDE  3,330,598
PNEUMATIC SEAT

Filed Feb. 14, 1966  2 Sheets-Sheet 1

GEORGE H. WHITESIDE,
INVENTOR

BY Robert A. Spray
ATTORNEY

July 11, 1967 G. H. WHITESIDE 3,330,598
PNEUMATIC SEAT
Filed Feb. 14, 1966 2 Sheets-Sheet 2
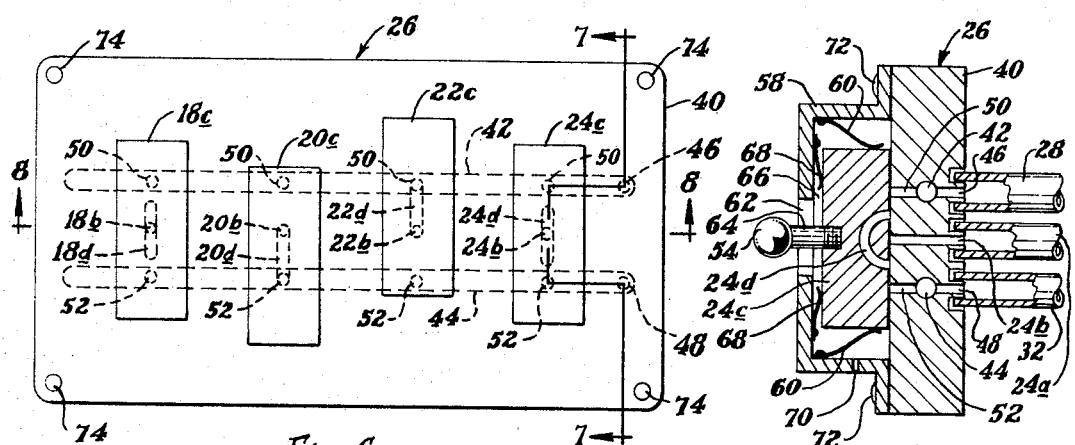
Fig.6
Fig.7
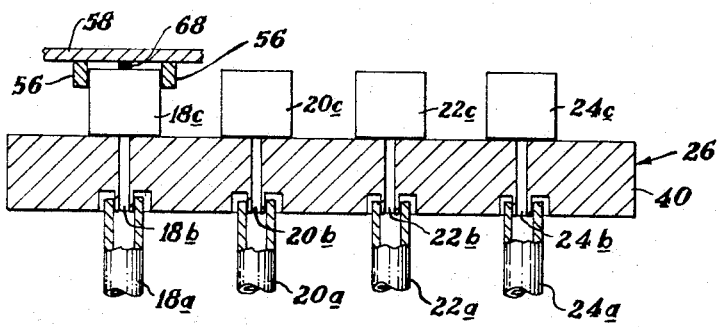
Fig.8
GEORGE H. WHITESIDE,
INVENTOR
BY Robert A. Spray
ATTORNEY 3,330,598
PNEUMATIC SEAT
George Harold Whiteside, R.R. 11, Box 648,
Indianapolis, Ind. 46206
Filed Feb. 14, 1966, Ser. No. 528,028
6 Claims. (Cl. 297—284)

ABSTRACT OF THE DISCLOSURE

A seat having pneumatic components, with control valving, for selective pressurization of the parts to provide seat adjustment variations of seat-height, seat adjustment fore-and-aft, and seat-tilt, and combinations of those adjustments.

---

This invention relates to seats, particularly for a vehicle; and concepts of the invention provide a seat having economical pneumatic components, actuatable at the will of the user, by which variations of seat-adjustment may be readily adjusted, as for height and tilt.

By concepts of the invention, accordingly, considerable variations of such seat-adjustment are attainable, without complex multi-position seat mechanisms.

In carrying out the invention in the illustrated embodiment, there are provided a plurality of pneumatically-operative flexible compartments fitted into the seat-portion and into the back-portion of a seat. Valving, which is accessible to the occupant, is provided to control the pressure in each individual compartment, to selectively obtain the particular desired overall pattern of support which provides in effect the desired support of the occupant in the position of height and posture the occupant desires. The variation in the patterns of support which are attainable gives a seat-adjustment effect.

The description so far given is of an introductory nature; and the above and other features, objects, concepts, and advantages of the present invention are more fully set forth in the following detailed description of an illustrative embodiment, reference being had to the accompanying somewhat diagrammatic and schematic drawings, in which:

FIG. 6 is a side elevational view of a valve mechanism shown in FIG. 1, the cover plate having been removed;

FIG. 7 is a cross-sectional view of the valve mechanism, the view being taken generally as indicated by view-line 7—7 of FIG. 6; and FIG. 8 is a cross-sectional view of the valve mechanism, the view being taken generally as indicated by view-line 8—8 of FIG. 6.

Figure 1:
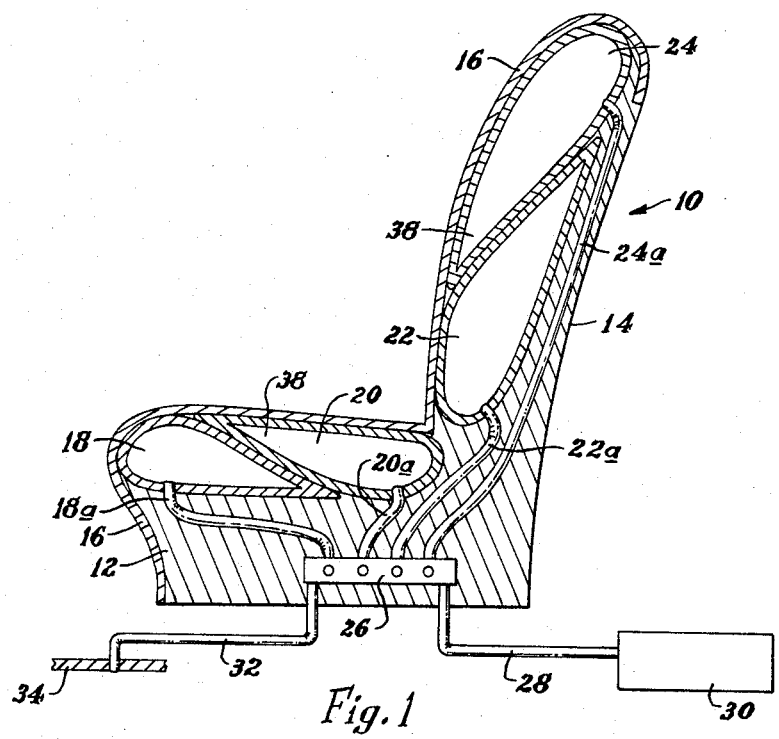
FIG. 1 is a longitudinal cross-sectional view of a vehicle seat embodying adjustable pneumatic compartmentation and associated valving and pneumatic system.

As shown in the drawings, the invention is shown in conjunction with a vehicle seat 10 having a seat-portion 12 and a back-portion 14 covered suitably by facing upholstery 16 as desired.

In accordance with concepts of the invention, the seat-portion 12 and back-portion 14 of the seat 10 are provided with flexible pneumatic compartments, the seat-portion 12 being shown with a forward and a rearward pneumatic compartment 18 and 20, and the back-portion 14 being shown with a lower and an upper pneumatic compartment 22 and 24. Although the pneumatic compartments are shown interiorly of the seat 10, having reference to the layer of upholstery 16 shown, it will be understood that the upholstery 16 and any padding or other material under the upholstery will be sufficiently flexible so as to enable the pneumatic pressure in the various compartments to exert supporting pressure upon the seat occupant, as is to be described and illustrated below.

Pneumatic lines 18a, 20a, 22a, and 24a, are shown leading to the compartments 18, 20, 22, and 24, each line being identified by a reference numeral corresponding to that of the compartment to which it leads, but followed by the suffix a. The pneumatic lines lead from a valving mechanism 26 (details of which are explained below). The valving mechanism 26 is supplied through a pneumatic line 28 from an associated pneumatic supply 30 (which may be a pump or compression chamber carried by the vehicle, as desired), and the valving mechanism 26 is provided with a pressure-relief line 32 shown as a vent line leading exteriorly of the vehicle indiated at 34.

Seat-adjustment effects are illustrated in FIGS. 2 through 5, wherein an occupant 36 is indicated as seated on the seat 10. As illustrative of one adjustment, a comparison of FIGS. 2 and 3 indicates a height-adjustment attainable by selected variation in both compartments 18 and 20, FIG. 3 indicating a greater pressure having been applied to those compartments than in FIG. 2.

Figures 2, 3, 4, 5:
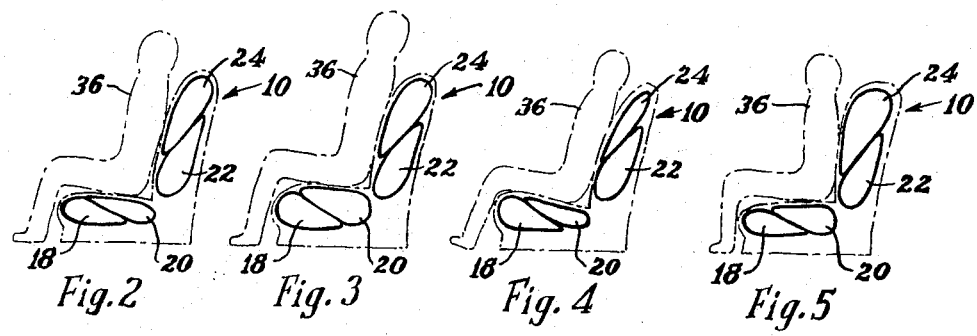
FIG. 2 is a schematic representation of a seat in one position of adjustment.
FIGS. 3, 4, and 5 are similar schematic representations of a seat in various other positions of adjustment, the adjustments illustrated in FIGS. 2 through 5 being explained in the accompanying description which follows.

FIG. 4 illustrates another adjustment, wherein a rearward posture-support is attained by relatively high pressurization of compartments 18 and 22 in comparison to that of compartments 20 and 24.

FIG. 5, conversely, illustrates a forward posture-support by relatively high pressurization of compartments 20 and 24 in comparison to that of compartments 18 and 22.

Adjacent compartments are shown as having an overlapping relationship, as indicated at 38; and this lessens an abrupt change of support-effect or humping even though each of the adjacent compartments is individually controlled by the pressure-control means 26.

The valving mechanism 26 shown in FIG. 1 is shown in greater detail in FIGS. 6 through 8. As there shown, it comprises a body member 40, formed to provide a pressure duct 42 and a relief duct 44. A passage 46 leads from pressure duct 42 to the pressure line 28; and a passage 48 leads from relief duct 44 to vent line 32.

The body member 40 is also provided with through passages 18b, 20b, 22b, and 24b, each identified by a reference numeral corresponding to that of the compartment and the compartment communicating line to which it leads, but followed by the suffix b. The passages 18b, 20b, 22b, and 24b are longitudinally spaced.

Each of the pressure duct 42 and relief duct 44 is provided with a set of passages, respectively identified as 50 and 52, which open onto the face of the body member 40, one of the passages 50 and one of the passages 52 being shown in vertical alignment with one of the passages having the suffix b but on opposite sides thereof.

Adjustable valve members 18c, 20c, 22c, and 24c, each having respectively a communicating passage 18d, 20d, 22d, and 24d, and each having a control handle 54, are provided for each compartment and compartment passage to which the reference numeral corresponds. The valve members 18c, 20c, 22c, and 24c are shown guided for vertical movement by guides 56 carried on a cover plate 58.

Springs 60 are shown vertically acting both upwardly and downwardly on each of the valve members 18c, 20c, 22c, and 24c, normally biasing each of those valve members to a central or neutral position (FIG. 7) in which the communicating passage (shown in FIG. 7 as 24d, the valve member in FIG. 7 being 24c) is not in communication with either the pressure passage 50 or the relief passage 52.

Movability of the valve member (illustrated in FIG. 7 as 24c), against the bias of springs 60, upwardly or downwardly as desired, will be seen, respectively, to move its communicating passage (24d) to selectively communicate the compartment-communicating passage (24b) with the pressure-passage 50 or with the relief-passage 52, respectively applying pressure to the associated compartment (24) or relieving pressure therein. (FIG. 7 illustrates this control for valve-member 24c and compartment 24; but it will be understood that the other compartments are similarly regulatable by similar mechanism and pneumatic circuitry.)

Thus, the various compartments (18, 20, 22, and/or 24) may be selectively pressurized and/or vented to attain the desired overall pattern of occupant-support as discussed above.

Elongated slots 62 in the front face of cover plate 58 permit the movement of the shank 64 of each control knob 54, which selectively actuates the control movement of the valve members designated with the suffix c.

Safety against any undesired excess of pressure is shown guarded against by the provision of clearance space 66 between the valve member (24c in FIG. 7) and the cover plate 58, permitting the valve member (24c) to move outwardly as forced by the extra pressure, against the inward bias of springs 68 shown carried on the rear wall of the cover plate 58. The excess pressure, which then bypasses the valve member (24c) inside the cover plate 58, is vented through a vent 70 provided in a wall of the cover plate 58.

Suitable fasteners 72 are shown holding the cover plate 58 to the body-member 40; and the body-member 40 is shown provided with suitable openings 74 (FIG. 6) through which suitable fasteners may be passed to secure the body-member 40 to the seat 10. The valve assembly 26, as indicated in FIG. 1, is mounted to the seat 10 in a suitable location in which its control knobs 54 are conveniently accessible to the seat-occupant.

It will be understood that in the text and claims the terminology is meant in its broad sense, and, for brevity, the terminology is meant to include other details and alternatives as come within the scope of the novel concepts. Thus, for example, the term "pneumatic" includes any sort of actuatable medium, whether gaseous or liquid; and the pressure-relief means may be other than that of the venting means shown; and, although the seat construction is shown as that of a seat for a vehicle, and is particularly useful in that employment, the invention is not limited thereto.

It will be thus seen that inventive concepts provide a novel means by which a variety of seat adjustments are readily and conveniently attainable, and permitting the user to attain any selected position by infinitely small increments of adjustment, to suit and fit the posture and physical nature of the user and provide the individually-selected support the user desires.

Thus, the present invention accomplishes its intended objects, including those hereinbefore pointed out and others that are inherent in the invention.

It will be understood that modifications and variations may be effected without departing from the scope of the novel concepts of the present invention. Accordingly, the invention is not to be considered limited to the specific form or arrangements herein described and shown.

What is claimed is:

1. A seat construction embodying a seat-portion and a back-portion, comprising:
   a plurality of pneumatically-operative compartments supportingly associated with the seat-portion and the back-portion of the seat;
   and a pneumatic system, including pressure-control means, for selectively actuating said compartments pneumatically to effect desired variations of support for an occupant of said seat;
   the pressure-control means providing a pressurization of said compartments at individually-selected amounts;
   the compartments being formed to provide an overlapping relationship of adjacent compartments, lessening an abrupt change of support-effect or humping even though each of the adjacent compartments is individually controlled by the pressure-control means;
   the seat-portion having at least two of said compartments spaced laterally, the compartmentation being of a nature such that variations in magnitude of substantially similar pressurization of said laterally-spaced compartments provide variations in effective seat-height, and variations in magnitude of differing pressurization of said laterally-spaced compartments provide variations in effective seat tilt.

2. A seat construction embodying a seat-portion and a back-portion, comprising:
   a plurality of pneumatically-operative compartments supportingly associated with the seat-portion and the back-portion of the seat;
   and a pneumatic system, including pressure-control means, for selectively actuating said compartments pneumatically to effect desired variations of support for an occupant of said seat;
   the pressure-control means providing a pressurization of said compartments at individually-selected amounts;
   the compartmentation including generally end-to-end positioning of compartments and providing translation of the support positioning achieved by the seat construction and providing also variation in effective seat-tilt, by selective pressurization of compartments.

3. A seat construction embodying a seat-portion and a back-portion, comprising:
   a plurality of pneumatically-operative compartments supportingly associated with the seat-portion and the back-portion of the seat;
   and a pneumatic system, including pressure-control means, for selectively actuating said compartments pneumatically to effect desired variations of support for an occupant of said seat;
   the compartmentation and the pneumatic system being such that effective variations in effective seat-tilt are obtainable by selective operation of the pressure-control means.

4. A seat construction, comprising:
   a plurality of pneumatically-operative compartments supportingly associated with the seat;
   and a pneumatic system, including pressure-control means, for selectively actuating said compartments pneumatically to effect desired variations of support for an occupant of said seat;
   the seat having at least two of said compartments spaced laterally, the compartmentation being of a nature such that variations in magnitude of substantially similar pressurization of said laterally-spaced compartments provide variations in effective seat-height, and variations in magnitude of differing pressurization of said laterally-spaced compartments provide variations in effective seat tilt.

5. A seat construction, comprising:
   a plurality of pneumatically-operative compartments supportingly associated with the seat;
   and a pneumatic system, including pressure-control means, for selectively actuating said compartments pneumatically to effect desired variations of support for an occupant of said seat;
   the pressure-control means including a body member including a pressure means; and valve means for selectively communicating each of said pneumatically actuated components with said body member pressure means;

the seat having at least two of said compartments spaced laterally, the compartmentation being of a nature such that variations in magnitude of substantially similar pressurization of said laterally-spaced compartments provide variations in effective seat-height, and variations in magnitude of differing pressurization of said laterally-spaced compartments provide variations in effective seat tilt.

6. The invention as set forth in claim 3, in a combination in which the compartmentation which provides for selective variation in effective seat-tilt are such also as to provide translation of the support positioning by selective operation of the pressure-control means.

References Cited
UNITED STATES PATENTS

| | | | |
|---|---|---|---|
| 1,976,320 | 10/1934 | Austin | 297—369 |
| 2,136,510 | 11/1938 | Jensen. | |
| 2,495,124 | 1/1950 | Morner. | |
| 2,520,455 | 8/1950 | Clachko | 269—325 |
| 2,684,672 | 7/1954 | Summerville | 297—284 |
| 2,938,570 | 5/1960 | Flajole. | |
| 3,171,691 | 3/1965 | Buehrig. | |
| 3,192,541 | 7/1965 | Moore | 297—284 |

DAVID J. WILLIAMOWSKY, *Primary Examiner.*

FRANK B. SHERRY, *Examiner.*

G. O. FINCH, *Assistant Examiner.*